United States Patent
Brady, Jr.

[11] Patent Number: 5,851,392
[45] Date of Patent: Dec. 22, 1998

[54] PROCESS AND APPARATUS FOR DOCTORING SOLIDS FROM A ROTARY FILTER

[76] Inventor: C. Lamar Brady, Jr., 139 Cypress Bend Rd., Selma, Ala. 36703

[21] Appl. No.: 748,470

[22] Filed: Nov. 8, 1996

[51] Int. Cl.⁶ .................................................. B01D 33/46
[52] U.S. Cl. ..................... 210/396; 210/784; 210/791; 210/402; 15/256.53; 55/296
[58] Field of Search ................... 210/784, 791, 210/396, 402, 408, 777; 15/256.53; 55/296, 295, 297

[56] References Cited

U.S. PATENT DOCUMENTS

| | | |
|---|---|---|
| 1,415,825 | 5/1922 | Bates . |
| 2,120,455 | 6/1938 | Barnebl . |
| 2,827,175 | 3/1958 | Cataldo . |
| 3,688,337 | 9/1972 | Noda . |
| 3,692,182 | 9/1972 | Patton . |
| 4,836,917 | 6/1989 | Tomita . |
| 5,143,555 | 9/1992 | Brady . |
| 5,149,448 | 9/1992 | Mattelmaki . |
| 5,607,588 | 3/1997 | Peterson . |

FOREIGN PATENT DOCUMENTS

| | | |
|---|---|---|
| 1215054 | 4/1960 | France . |
| 1461440 | 10/1969 | Germany . |
| 56-38111 | 4/1981 | Japan . |

*Primary Examiner*—Thomas M. Lithgow
*Attorney, Agent, or Firm*—Bradley Arant Rose & White LLP; J. David Pugh

[57] ABSTRACT

The present invention provides a self cleaning doctor blade which is a floating blade containing beveled edges or "relief gaps" comprising beveled mitered leading edges on each blade. This arrangement allows for the blades as a whole to remain free from build-up of fine particulate matter. The invention further provides a doctor blade made of replaceable units allowing for fine adjustment of blade-to-drum surface distance as well as replacement of small damaged segments rather than the whole blade.

6 Claims, 3 Drawing Sheets

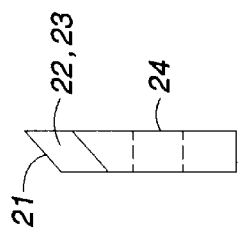
FIG. 5
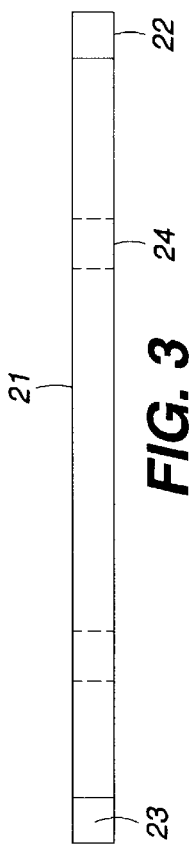
FIG. 3
FIG. 4
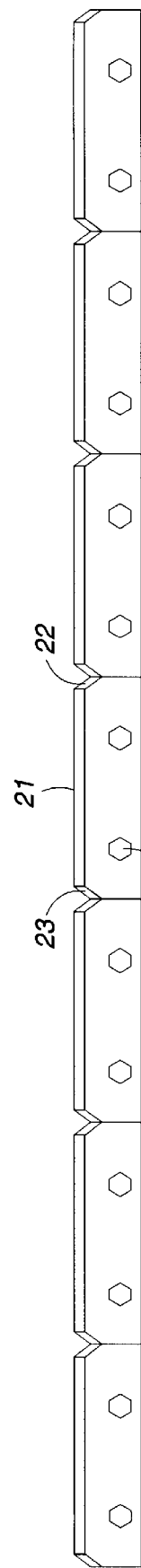
FIG. 6

PROCESS AND APPARATUS FOR DOCTORING SOLIDS FROM A ROTARY FILTER

FIELD OF THE INVENTION

This invention relates generally to the process of filtering lime solids from a slurry using a filtering drum which is rotated through a vat containing the lime mud slurry and from which the lime mud is dewatered and then shaved, or "doctored," off of the rotating drum by a cutting blade for use in an industrial or manufacturing process such as paper making. Specifically, this invention relates to an improved doctor blade that is self-cleaning and which may be used for continuously removing the lime mud coat from the rotating filter drum.

BACKGROUND OF THE INVENTION

There are a number of industrial and manufacturing processes in which solids are filtered from solid-liquid mixtures in which the insoluble solids are suspended, also known as slurries. In some of these processes, the solid material is used over and over again by treating the material in some liquid by which the material is also transported to the point it is needed in the process. For example, in a typical paper making operation, calcium carbonate, or "lime mud" is one of the by-products of reacting clarified "green liquor" with quicklime. The lime mud is separated from the mixture, then it is washed with water to recover its soda values, then calcined in a lime kiln, which is recycled back to the slaking operation. Separating or filtering the lime mud can be accomplished by sedimentation, filtration or centrifugation. However, it is generally known in the art that the most efficient means of separating the lime mud solids is to use a rotary filtering machine. In such a machine, a drum or other cylindrically shaped object having a filtering means wrapped around its surface is rotated through a vat into which the lime mud slurry is pumped. A vacuum is applied to the interior of the drum causing a pressure drop at the surface of the drum. As the drum rotates, the solids in the slurry are drawn to the filter surface due to the vacuum. Moisture and small particles of lime pass through the filtering means leaving the larger, dewatered lime mud solids to form a coating on the surface of the rotating drum. This coating is known as the lime mud precoat. As the drum continues to rotate, a cutting means is applied to the drum surface to shave off, or "doctor," the lime which then drops onto a conveyor so it may be reused in the paper making process. However, the entire coating of lime mud cannot be shaved off at once, or the vacuum inside the rotating drum would be lost. The water and fine particles which pass through the filter means are recovered and pumped back through the same process.

It has been common practice in the art to use a metal blade placed longitudinally along the entire length of the rotating drum to doctor the lime mud solids. However, practitioners of the art have observed a number of drawbacks which the present invention remedies or avoids entirely. First, as previously observed, a coating of lime mud must remain on the drum at all time, of sufficient thickness to avoid a loss of the vacuum inside the drum. Over time, the very fine particles of lime solids migrating through the coat of mud on the filter tend to fill all the voids in the filter surface, causing the filter to "blind over" preventing the continued flow of moisture through the filter. The only remedy for such event is to stop the doctoring process, drop the vacuum, remove the existing layer of lime mud, and re-precoat the drum before resuming doctoring operations. The down-time required is quite disruptive to the paper making process which depends on a steady flow of lime of closely controlled quality.

The other drawback is a build up of fine particles on the doctoring blade. Over time, the same fines which can cause the filter to blind over tend to collect on the surface of the doctor blade. The blade commonly extends the length of the drum. As the fine particles collect on the blade, there is no place for them to go, especially as they collect in the center of the blade. The particles begin to dry and then form a hard heel which sticks to the surface of the blade significantly reducing the doctor blade's cutting effectiveness and precision. Any attempt to clean or replace the blade requires shutdown of the entire operation.

The prior art has devised a number of methods and apparatuses which attempt to address the known drawbacks of the process. One prior art method advances the blade into the lime mud precoat then withdraws the blade from the lime mud precoat on a regular cycle. As the blade advances into the mud precoat, the fines are removed, the surface of the precoat is roughened, and the fines on the doctor blade are pushed off. While effective for extending the time before the filter blinds over and for cleaning the blade, this method has severe disadvantages. The constant variation in cutting depth causes wide fluctuations in the volume and moisture content of lime mud removed from the drum. These conditions render it virtually impossible to control the ratio of air and fuel necessary to be added to the lime kiln to control oxygen content and gas temperature inside the kiln. This results in poor reburned lime quality, undesirable fluctuations in total reduced sulphur, and particulate emissions in the lime kiln stack gases, which must be filtered and removed to comply with pollution regulations. The use of the method has only been effective to extend the time between "blind over" to about once every eight hours at a minimum and often at more frequent intervals.

Another method utilizes a stationary doctor blade in conjunction with a high pressure oscillating water nozzle. The nozzle sprays water at high pressure across the drumface blasting the outer surface of the lime mud precoat to remove the fines and allowing the drum to re-precoat while continuing to operate. While this method does provide a more steady volume of lime mud to the kiln, there is a substantial fluctuation in moisture content when the water is sprayed resulting in increased fuel consumption in the kiln as discussed above.

Yet a third method is disclosed in U.S. Pat. No. 5,143,555 entitled TRAVELLING DOCTOR BLADE by Brady ("Brady"). Brady teaches the use of a first stationary doctor blade in conjunction with a second travelling doctor blade, located upstream of the stationary blade, and which oscillates back and forth across the surface of the drum at a steady rate. The second oscillating blade is shorter than the first stationary blade and is set closer to the surface of the drum. The second blade travels back and forth removing the fines before they reach the filter surface causing it to blind over and before they can build up on the surface of the stationary blade. Use of this method has been known to extend the time between blind over up to once every one to three weeks.

Like Brady, other prior art devices teach the use of either a second blade or other second cutting or scraping means. U.S. Pat. No. 4,836,917 entitled APPARATUS FOR PERFORMING SEPARATION OF A SOLID-LIQUID MIXTURE by Tomita, et al. ("Tomita"), teaches an oscillating cutter means in conjunction with a stationary blade.

However, Tomita does not operate the cutter means continuously using it instead only after blind over. Secondly, when engaged and in use, the cutter means touches the drum surface instead of being spaced from the surface as are the two blades in the Brady patent. U.S. Pat. No. 3,869,389 entitled PROCESS AND APPARATUS FOR FILTERING SUSPENSIONS by Rokitansky and U.S. Pat. No. 4,146,484 entitled DOCTOR BLADE CLEANING ASSEMBLY by Campbell both teach the use of a second blade (automatic blade 70, Rokitansky) or a second scraper (scraper 43, Campbell) in conjunction with a stationary doctor blade to clean and remove fine particles which build up on the doctor blade.

Unlike the prior art, the present invention is effective to extend the time between blind over and for maintaining a clean doctor blade without the use of a second blade, scraper or high pressure water nozzle. In the present invention, the first blade extends most, but not all, of the length of drum and is made to travel back and forth across the surface of the drum. The blade also has a series of relief gaps in the cutting edge of the blade, each of which is beveled relative to the bottom surface of the blade. Moreover, instead of one long monolithic piece of metal, the cutting surface in the present invention can be made up of a series of short doctor blade teeth units placed end to end and held in place by attaching to a metal plate or some other suitable clamping or supporting means. This construction allows the user to replace only small sections of the blade as individual blade teeth units nick or become dull from use resulting in cost savings to the user. Alternatively, a single piece blade may be used if desired, provided the relief gaps are present. The travelling action of the blade acts to remove the fines and to clean and sharpen the blade. The discontinuous mitered and bevelled surface created by the relief gaps allows the fines to drop beneath the blade and to be returned to the mud washing process or to be removed with the larger mud solids instead of building up on the blade surface.

In an example of the present invention, individual blade teeth plate units were prepared which are 4.5 inches in length, 1.385 inches wide. They can be of varying thickness, although in this example a 0.125 inch thick metal plate was used. As stated previously, a single piece blade may be used if desired instead of using a multiplicity of separate blade units. The cutting edge which is to be in contact with the lime mud precoat is bevelled relative to the bottom surface of the blade, preferably about 58 degrees. The corners of each individual blade are mitered relative to the cutting edge preferably about 40–50 degrees and extending back from the cutting edge about 0.25 inches. The mitered corners are also beveled relative to the bottom surface in the same manner as the cutting edge. When the individual blade teeth plate units are placed end to end and secured onto a supporting metal plate, the mitered and beveled corners of each individual blade form the desired relief gaps for removing the fines. A single piece blade would have a series of mitered and bevelled gaps spaced along the length of the blade. Experimental results have established that the present invention is useful for extending the time between blind over to several weeks, and possibly months. At a minimum, the user should expect to receive at least one month of service between blind over.

Accordingly, one object of the invention is to provide an improved means for doctoring line mud solids from a rotary drum filter with the use of a single, self-cleaning, travelling doctor blade.

Another object of the invention is to extend the time between blind over on the filter thereby greatly reducing the number of times the filter must be re-precoated with line mud.

Yet another object is to reduce maintenance costs and inconvenience by allowing the user to replace specific short lengths of blades as they nick or become dull instead of replacing the entire single piece blade.

BRIEF DESCRIPTION OF THE DRAWING

The foregoing and other objects, features and advantages of the present invention will be made apparent from the following detailed description of the preferred embodiment of the invention and from the drawings, in which:

FIG. 3 is a top view of an individual blade unit;

FIG. 4 is a bottom view of an individual blade unit; and

FIG. 5 is a side view of an individual blade unit.

FIG. 6 is a plan view of a series of individual blade units in place for use as a travelling doctor blade.

DETAILED DESCRIPTION OF THE DRAWINGS

Figure 1:
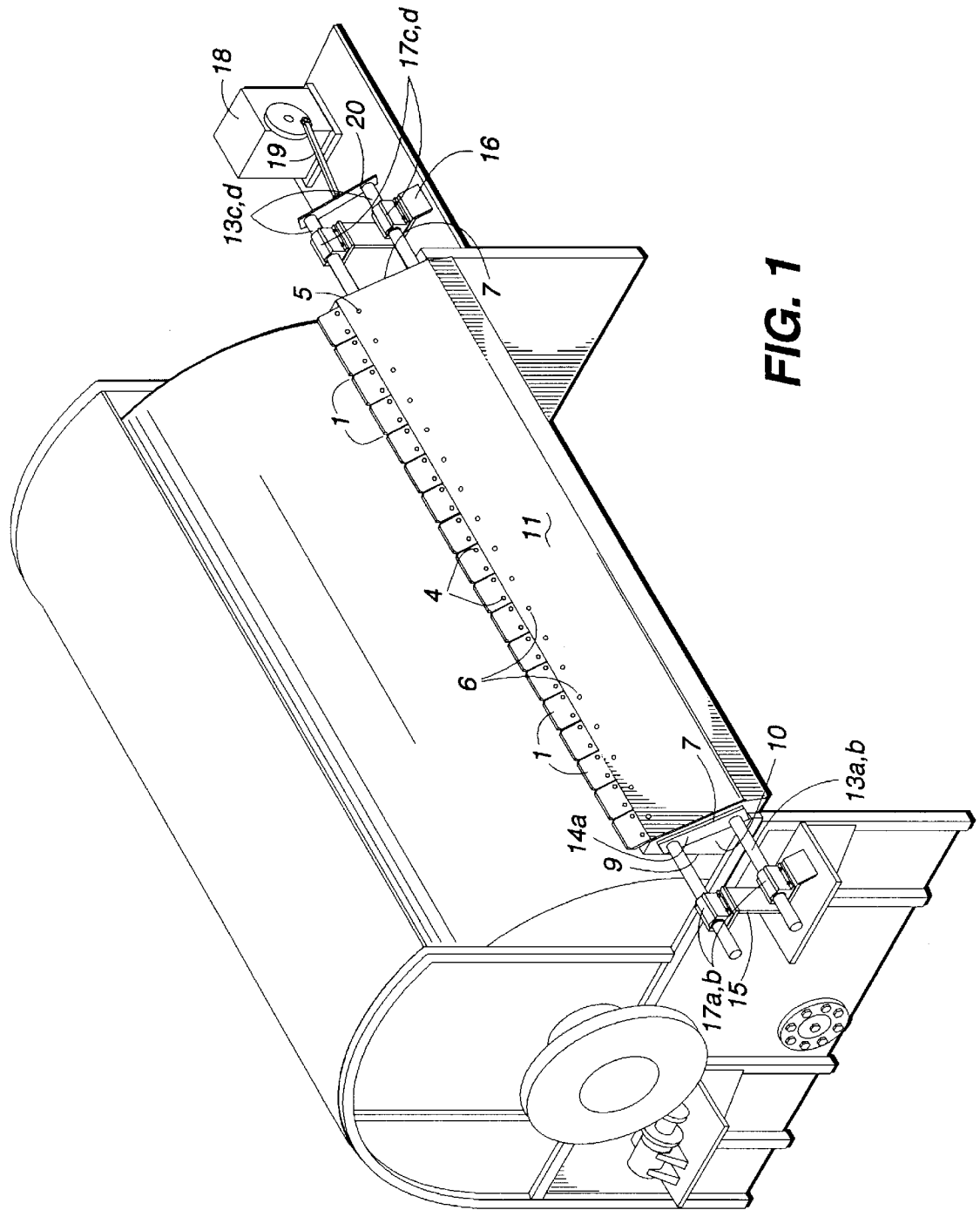
FIG. 1 is a perspective view of a rotary lime mud precoat filter of the type described herein.
Figure 2:
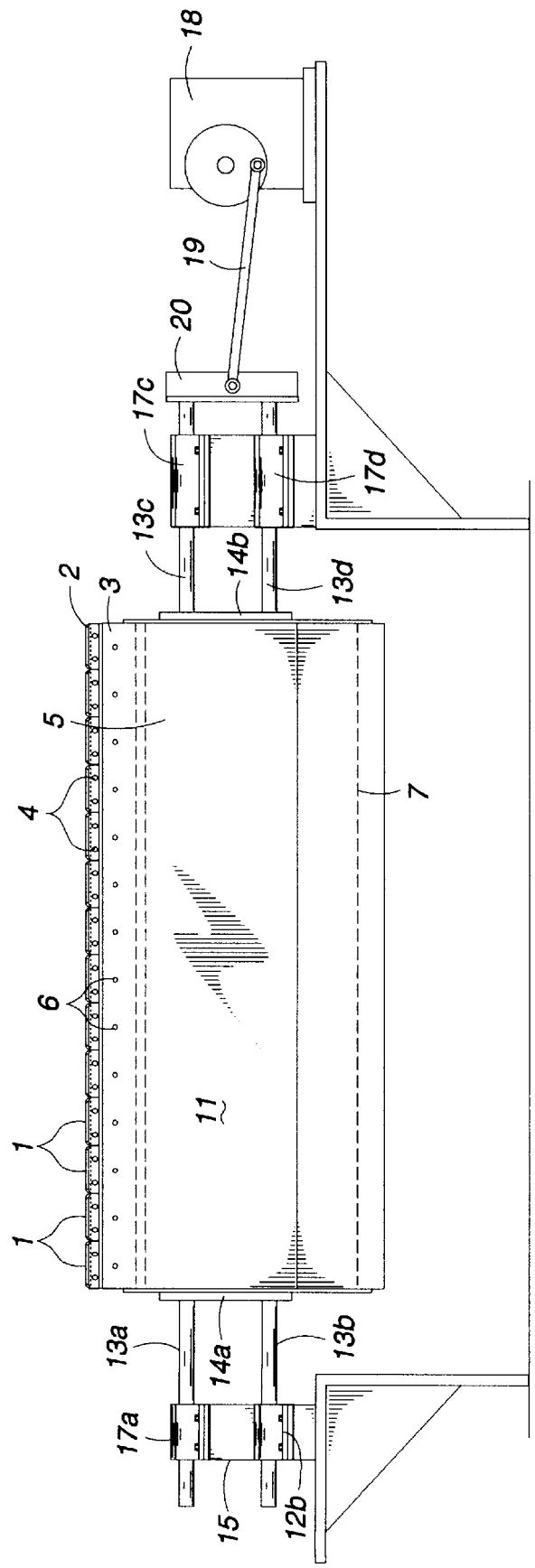
FIG. 2 is a side view of entire blade made of individual blade units clamped to a blade support plate which is attached to a reciprocating or travelling means.

FIG. 1 is a perspective view of a rotary filter of the type described herein, useful for understanding the general arrangement of the present invention. The structure labelled on FIG. 1 is described in detail as follows for FIG. 2. Referring now to FIG. 2 doctor blade assembly 11 consists of plurality of blade teeth units 1 which are held against the upper leading edge 2 of blade teeth support plate 3. The blade teeth units 1 may be held against blade teeth support plate 3 by numerous means including screws. Screw holes 4 in each blade tooth unit may further be oblong so as to allow each blade tooth unit to be adjusted such that the leading edge 2 of the blade tooth unit may be spaced closer or farther out from the leading edge 2 of blade support plate 3.

Blade support plate 3 is held against blade cushion seat plate 5 by a plurality of set screws 6. Blade cushion seat plate 5 is a large sheet usually comprising a slab of ⅛ in. gage sheet metal that has a bend in its lower end giving rise to the cushion having two surfaces "a" and "b" existing in two separate planes. Plan surface "a" clamps to the blade support plate 3 while a portion of plane surface "b" provides support for base plate 7. Extending from the inner edge 8 of base plate 7 is vertical plate support 9, the upper edge of which rests against the lower surface of and supports blade support 3.

Connected to the lateral edges of each end of the cushion seat plate 5, base plate 7 and vertical support 9 are side plates 10 and 12. Side plates 10 and 12 add structural integrity to the doctor blade assembly 11 as well as provide a surface for attaching lateral shift support arms 13a, 13b, 13c and 13d.

The lateral shift support arms 13a, 13b, 13c and 13d are connected to side plates 10 and 12 of doctor blade assembly 11 by lateral shift support base plates 14a and 14b.

The lateral shift support arms 13a, 13b, 13c and 13d are supported along the respective lengths by bearing housings 15 and 16 each of which contain two adjustable bearings 17a, 17b, 17c, and 17d capable of supporting a portion of the doctor blade assembly 11 weight and further accept one of each of the lateral shift support arms 13a, 13b, 13c, and 13d such that the arms may move freely in a reversible lateral motion through each bearing.

The doctor blade assembly 11 is made to shift laterally back and forth by action of a motor connected to a pulley drive assembly 18. The pulley drive assembly 18 has a pulley arm 19 which is connected to a lateral shift drive block 20. The drive block is in turn attached to the lateral shift support arms extending from the blade assembly 11 and may be attached to either side of doctor blade assembly.

Referring to FIGS. 3, 4, 5 and 6 each blade tooth unit 1 has a leading or cutting edge 21. At each end 22 and 23 along the leading edge of each blade tooth 1 the blade is mitered and preferably each mitered end is further beveled at the same degree of inclination as the leading edge of the blade. The blade tooth unit 1 further has screw hole slots 24 which may be elongated so as to allow each individual tooth blade to be properly adjusted.

While the preferred embodiment of the present invention is shown and described, it is envisioned that those skilled in the art may devise various modifications of the present invention without departing from the spirit and scope of the claims. The invention is not intended to be limited by the foregoing disclosure, but only by the following appended claims:

I claim:

1. An improved slurry apparatus doctor blade assembly comprising:
    a. A plurality of blade teeth plates, each of said blade teeth plates having a leading edge, said leading edge having mitered left and right ends, said leading edge and left and right mitered ends further having a bevel;
    b. A means for supporting said plurality of blade teeth plates; and
    c. A means for slidably supporting said plurality of blade teeth plates such that said slidably supporting means will allow said blade assembly to move reciprocally along an axis defined by the length of said leading edge of said blade teeth plates.

2. An apparatus according to claim 1 wherein said means for slidably supporting said blade assembly comprises adjustable bearings and bearing housings.

3. An improved slurry apparatus doctor blade assembly comprising:
    a. A blade having a leading edge, said leading edge having a bevel, said leading edge further having a series of spaced relief gaps mitered into the leading edge, said mitered relief gaps further having a bevel;
    b. A means for supporting said blade; and,
    c. A means for slidably supporting said blade such that said slidably supporting means will allow said blade assembly to move reciprocally along an axis defined by the length of said leading edge of said blade.

4. An apparatus according to claim 3 wherein said means for slidably supporting said blade assembly comprises adjustable bearings and bearing housings.

5. A method for doctoring solids from a rotary filter comprising reciprocally sliding a single doctor blade assembly along the length of a rotary filter drum wherein said doctor blade assembly has a plurality of blade teeth plates, each blade tooth plate having a leading edge, said leading edge having mitered left and right ends, said leading edge and left and right mitered ends further having a bevel.

6. A method for doctoring solids from a rotary filter comprising reciprocally sliding a single doctor blade assembly along the length of a rotary filter drum wherein said doctor blade assembly has a blade having a leading edge, said leading edge having a bevel and further having a series of spaced relief gaps mitered into the leading edge, said mitered relief gaps further having a bevel.

* * * * *